(12) United States Patent
Wang et al.

(10) Patent No.: US 11,435,305 B2
(45) Date of Patent: Sep. 6, 2022

(54) THERMOGRAPHIC INSPECTION SYSTEM MOUNTED ON MOTORIZED APPARATUS AND METHODS OF USING SAME

(71) Applicant: General Electric Company, Schenectady, NY (US)

(72) Inventors: Guanghua Wang, Clifton Park, NY (US); Huan Tan, Clifton Park, NY (US); Bernard Patrick Bewlay, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 931 days.

(21) Appl. No.: 16/225,044

(22) Filed: Dec. 19, 2018

(65) Prior Publication Data

US 2020/0200692 A1 Jun. 25, 2020

(51) Int. Cl.
*G01N 25/72* (2006.01)
*G01N 29/22* (2006.01)
(Continued)

(52) U.S. Cl.
CPC ........... *G01N 25/72* (2013.01); *G01N 29/228* (2013.01); *G06T 7/0004* (2013.01); *G01J 5/00* (2013.01); *G01N 2291/02881* (2013.01)

(58) Field of Classification Search
CPC ................. G01N 25/72; G01N 29/228; G01N 2291/02881; G06T 7/0004
See application file for complete search history.

(56) References Cited

U.S. PATENT DOCUMENTS 4,518,307 A * 5/1985 Bloch .................. B25J 17/0208
414/729
6,712,502 B2 * 3/2004 Zalameda .............. G01N 25/72
374/5
(Continued)

FOREIGN PATENT DOCUMENTS

CN 101131353 A * 2/2008
CN 101606058 A 12/2009
(Continued)

OTHER PUBLICATIONS

Gleiter, A. et al., "Lockin Thermography with Optical or Ultrasound Excitation", Journal of Mechanical Engineering, pp. 619-624, 2010.
(Continued)

*Primary Examiner* — Gail Kaplan Verbitsky
(74) *Attorney, Agent, or Firm* — Fitch, Even, Tabin & Flannery LLP

(57) ABSTRACT

A system for detecting the presence of an anomaly within a component includes a motorized apparatus configured to move around the component. The system also includes an excitation device and a camera mounted to the motorized apparatus. The excitation device is configured to emit an excitation signal toward the component to cause the anomaly within the component to generate a detectable reactionary thermal signal in response to the excitation signal. The camera is configured to capture thermal images of the component. The thermal images include the detectable reactionary thermal signal and indicate the presence of the anomaly within the component. The system further includes a controller communicatively coupled to the excitation device and the camera. The controller is configured to receive and analyze the thermal images to detect the presence of the anomaly within the component. The controller is configured to adjust one or more operating parameters of the
(Continued)

system to affect a characteristic of the detectable reactionary signal based on the thermal images.

20 Claims, 8 Drawing Sheets

(51) Int. Cl.
*G06T 7/00* (2017.01)
*G01J 5/00* (2022.01)

(56) References Cited

U.S. PATENT DOCUMENTS

| | | | |
|---|---|---|---|
| 7,083,327 B1* | 8/2006 | Shepard | G01N 25/72 |
| | | | 374/57 |
| 7,989,729 B1 | 8/2011 | Zhao et al. | |
| 8,373,758 B2* | 2/2013 | Guha | G06T 7/0004 |
| | | | 348/164 |
| 8,713,998 B2 | 5/2014 | Troy et al. | |
| 8,873,837 B2 | 10/2014 | Jahanshahi et al. | |
| 9,394,653 B2* | 7/2016 | Rutz | G01J 5/025 |
| 9,414,026 B2 | 8/2016 | Blanchard et al. | |
| 9,519,844 B1 | 12/2016 | Thompson et al. | |
| 9,790,923 B2 | 10/2017 | Krampe | |
| 10,191,014 B2 | 1/2019 | Hull et al. | |
| 2003/0043964 A1 | 3/2003 | Sorenson | |
| 2004/0071186 A1* | 4/2004 | Ignatowicz | G01J 5/0022 |
| | | | 374/139 |
| 2008/0137105 A1 | 6/2008 | Howard et al. | |
| 2010/0118137 A1* | 5/2010 | Avila | G01N 25/72 |
| | | | 348/125 |
| 2012/0320372 A1 | 12/2012 | Troy et al. | |
| 2015/0339830 A1 | 11/2015 | Heissenstein et al. | |
| 2017/0020615 A1* | 1/2017 | Koenig | A61B 34/72 |
| 2017/0052070 A1* | 2/2017 | Marsh | G01S 17/66 |
| 2018/0254208 A1* | 9/2018 | Chang | G01J 5/047 |
| 2018/0361595 A1* | 12/2018 | Troy | G01N 25/72 |
| 2021/0341403 A1* | 11/2021 | Shepard | G06T 7/0004 |

FOREIGN PATENT DOCUMENTS

| | | | |
|---|---|---|---|
| CN | 107192759 A | | 9/2017 |
| CN | 107831191 A | | 3/2018 |
| DE | 102012022104 B4 | | 8/2015 |
| DE | 102015005622 A1 | | 11/2016 |
| JP | 2001201474 A | * | 7/2001 |
| JP | 2003149188 A | * | 5/2003 |
| JP | 2005098959 A | * | 4/2005 |
| JP | 2016024056 A | * | 2/2016 |
| KR | 20150019401 A | * | 2/2015 |
| KR | 20150033802 A | * | 4/2015 |
| WO | 2010028619 A1 | | 3/2010 |
| WO | WO-2021262313 A2 | * | 12/2021 |

OTHER PUBLICATIONS

Yasmina et al., "Infrared Lock-in Thermography Crack Localization on Metallic Surfaces for Industrial Diagnosis", Journal of non destructive Evaluation, pp. 1-8, Dec. 2013.

S. Dutta et al., "New concept for higher Robot position accuracy during thermography measurement to be implemented with the existing prototype automated thermography end-effector utilising an industrial robot and laser system", Journal of German Aerospace center, pp. 1-9, 2014.

Ringermacher, H. et al., "Synthetic thermal time-of-flight (STTOF) depth imaging." In AIP Conference Proceedings, vol. 557, No. 1, pp. 487-491. AIP, 2001.

* cited by examiner

THERMOGRAPHIC INSPECTION SYSTEM MOUNTED ON MOTORIZED APPARATUS AND METHODS OF USING SAME

BACKGROUND

The field of the disclosure relates generally to a thermographic inspection system for detecting anomalies within a component and, more particularly to a thermographic inspection system mounted on a motorized apparatus configured to move the thermographic inspection system relative to the component.

At least some known machines include components that require periodic inspection and maintenance. For example, early detection of anomalies within the components allows for prompt maintenance or repair of the components. At least some known inspection systems utilize static images. However, it is challenging to detect anomalies, especially anomalies under the surface of the components, using static images. In addition, at least some known inspection devices, such as cameras that generate static images, are unable to detect anomalies that are under the surface of the components. Also, at least some known systems for maintenance or inspection include a motorized apparatus that is configured to travel about a component. However, some locations on components are difficult to access using at least some known motorized apparatus.

BRIEF DESCRIPTION

In one aspect, a system for detecting the presence of an anomaly within a component is provided. The system includes a motorized apparatus configured to move around the component. The system also includes an excitation device mounted to the motorized apparatus and configured to emit an excitation signal toward the component to cause the anomaly within the component to generate a detectable reactionary thermal signal in response to the excitation signal. The excitation signal is amplitude modulated at a selected frequency. The motorized apparatus is configured to position the excitation device relative to the component. The system also includes a camera mounted to the motorized apparatus and configured to capture thermal images of the component. The thermal images include the detectable reactionary thermal signal and indicate the presence of the anomaly within the component. The motorized apparatus is configured to position the camera relative to the component to capture a portion of the component exposed to the excitation signal. The system further includes a controller communicatively coupled to the excitation device and the camera. The controller is configured to cause the excitation device to emit the excitation signal. The controller is configured to receive and analyze the thermal images to detect the presence of the anomaly within the component. The controller is configured to determine a path for the motorized apparatus relative to the component based on the thermal images. The controller is configured to adjust one or more operating parameters of the system to affect a characteristic of the detectable reactionary signal based on the thermal images. The operating parameters may include one of a frequency of the excitation signal, an amplitude of the excitation signal, a phase of the excitation signal, a position of the motorized apparatus relative to the detected anomaly, a position of the excitation device relative to the detected anomaly, and a position of the camera relative to the detected anomaly.

In another aspect, a method for detecting an anomaly within a component is provided. The method includes moving a motorized apparatus relative to the component. A controller determines a path for the motorized apparatus based on areas of interest within the component. The method also includes positioning an excitation device relative to the component. The excitation device is coupled to the motorized apparatus. The method further includes emitting an excitation signal from an excitation device toward the component. The anomaly within the component generates a detectable reactionary thermal signal in response to the excitation signal. The method also includes controlling operation of the excitation device to control at least one characteristic of the excitation signal. The method further includes positioning a thermographic camera relative to the component using the motorized apparatus and capturing a thermal image of at least a portion of the component using the thermographic camera when the anomaly within the component generate the detectable reactionary thermal signal. The method also includes determining the presence of the anomaly in the component based on the thermal image. The method further includes adjusting one or more operating parameters of at least one of the motorized apparatus and the excitation device to affect a characteristic of the detectable reactionary signal based on the thermal images. The operating parameter may include one of a frequency of the excitation signal, an amplitude of the excitation signal, a phase of the excitation signal, a position of the motorized apparatus relative to the detected anomaly, a position of the excitation device relative to the detected anomaly, and a position of the camera relative to the detected anomaly.

In another aspect, an apparatus for detecting an anomaly within a component is provided. The apparatus includes a body, a manipulator arm coupled to the body, and a drive system configured to move at least one of the body and the manipulator arm relative to the component. The drive system is communicatively coupled to a controller configured to adjust one or more operating parameters of the drive system. The operating parameters may include one of a position of the motorized apparatus relative to the component, a position of the manipulator arm relative to the component, and a position of the body relative to the component. The apparatus also includes an excitation device mounted to the manipulator arm and configured to emit an excitation signal toward the component to cause the anomaly within the component to generate a detectable reactionary thermal signal in response to the excitation signal. The excitation device is communicatively coupled to the controller. The controller is configured to adjust one or more operating parameters of the excitation device to affect a characteristic of the detectable reactionary signal. The operating parameters may include one or more of a frequency of the excitation signal, an amplitude of the excitation signal, a phase of the excitation signal and a position of the excitation device relative to the component. The apparatus further includes a camera mounted to the manipulator arm and configured to capture thermal images of the component. The thermal images include the detectable reactionary thermal signal and indicate the presence of the anomaly within the component. The manipulator arm is configured to position the camera relative to the component to capture a portion of the component exposed to the excitation signal.

DRAWINGS

These and other features, aspects, and advantages of the present disclosure will become better understood when the following detailed description is read with reference to the accompanying drawings in which like characters represent like parts throughout the drawings, wherein.

Figure 1:
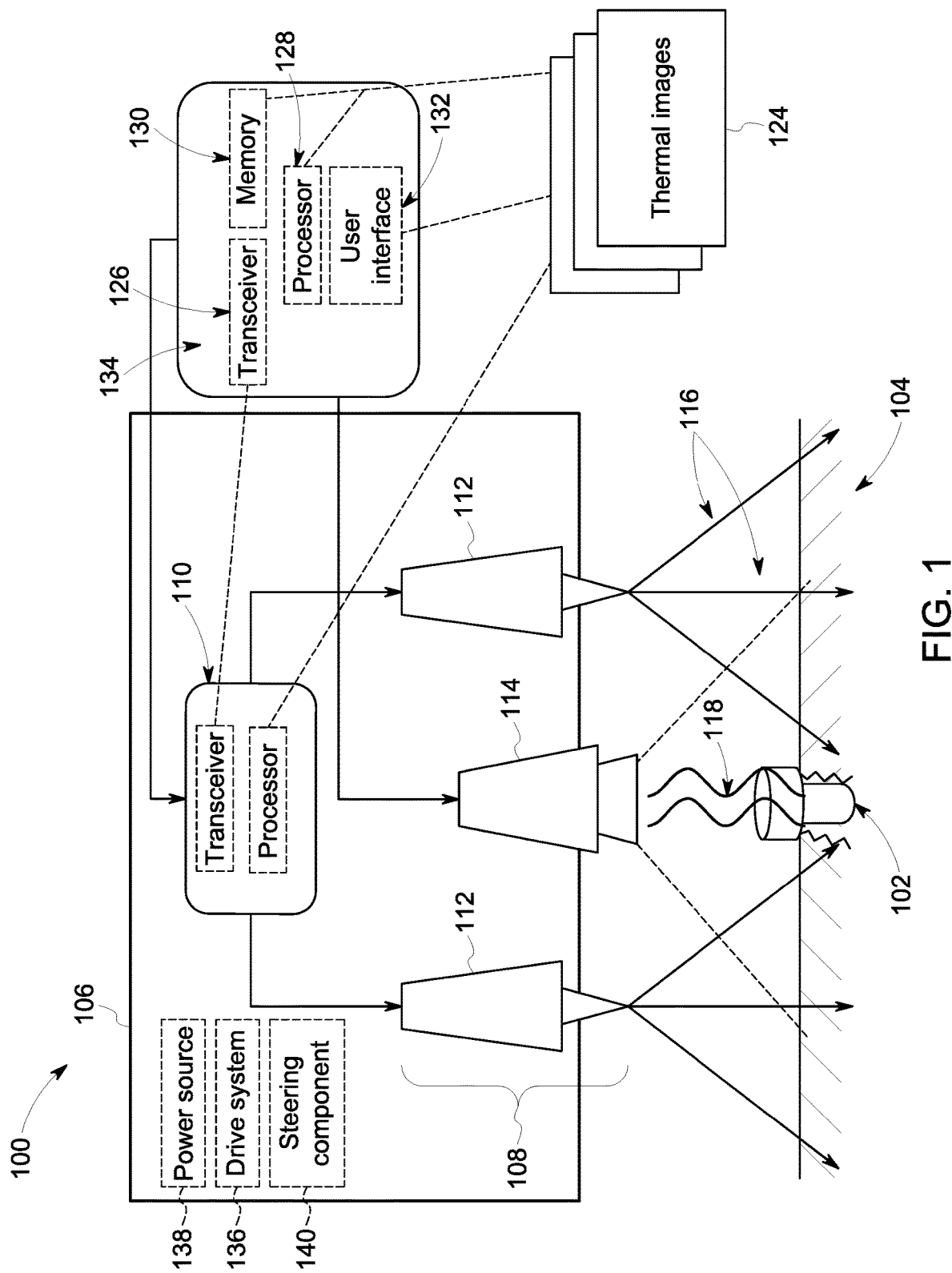
FIG. 1 is a schematic diagram of a system for detecting anomalies within a component.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the exemplary embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

As used herein, the terms "anomaly" and "anomalies" refer to areas of variation within a component. Areas of variation include, for example and without limitation, defects, dislocations, cracks, wear, voids, deformations, stress concentrations, disruptions, fissures, inclusion of foreign particles, and corrosion.

Also, as used herein, the term "thermal image" refers to any image generated using an object's infrared signature. For example, thermal images are generated using thermal imaging, near-infrared illumination, and/or low-light imaging.

Embodiments described herein provide systems and methods for detecting anomalies in components using thermographic inspection systems and positionable apparatus. The thermographic inspection system includes at least one excitation device and a thermal camera. The at least one excitation device and the thermal camera are mounted to the positionable apparatus such that the positionable apparatus adjusts the orientation and the location of the at least one of the excitation device and the camera relative to the component. Accordingly, the thermographic inspection system is able to move relative to the component and inspect different areas of the component. In some embodiments, a controller controls operation of the thermographic inspection system and the positionable apparatus and determines a scope and desired path for inspection of the complete component. The thermographic inspection system causes anomalies within the component to generate reactionary thermal signals that are detectable in thermal images captured by the thermal camera. As a result, the described systems and methods allow a component to be inspected using non-destructive methods without repositioning the component during inspection. In addition, the systems and methods increase the accuracy and reliability of inspections of components. Moreover, the systems and methods reduce the time required to inspect components.

FIG. 1 is a schematic diagram of a system 100 for detecting anomalies 102 within a component 104. System 100 includes a positionable apparatus 106, a thermographic inspection system 108, and a controller 110. In alternative embodiments, system 100 includes any components that enable system 100 to operate as described herein. For example, in some embodiments, system 100 includes a plurality of positionable apparatus 106.

In the exemplary embodiment, thermographic inspection system 108 includes at least one excitation device 112 and a thermographic camera 114. At least a portion of thermographic inspection system 108 is mounted to positionable apparatus 106 such that positionable apparatus 106 is configured to locate and orient at least one of excitation devices 112 and thermographic camera 114 relative to component 104. In the exemplary embodiment, thermographic inspection system 108 includes a plurality of excitation devices 112 mounted to positionable apparatus 106. Also, in the exemplary embodiment, thermographic camera 114 is mounted to positionable apparatus 106. In addition, in the exemplary embodiment, at least a portion of controller 110 is included in thermographic inspection system 108. In alternative embodiments, thermographic inspection system 108 includes any components that enable thermographic inspection system 108 to operate as described herein. For example, in some embodiments, thermographic inspection system 108 includes a single excitation device 112. In further embodiments, thermographic inspection system 108 includes a plurality of thermographic cameras 114.

Also, in the exemplary embodiment, excitation device 112 is configured to emit an excitation signal 116 toward and through component 104 such that anomalies 102 within component 104 generate a detectable reactionary thermal signal 118 when exposed to excitation signal 116. Each excitation device 112 includes any device that is capable of generating excitation signal 116. For example, in some embodiments, excitation devices 112 include at least one of an ultrasound device 156 (shown in FIG. 3) and an optical device 152 (shown in FIG. 2). In alternative embodiments, thermographic inspection system 108 includes any excitation device 112 that enables thermographic inspection system 108 to operate as described herein.

Also, in the exemplary embodiment, ultrasound device 156 is configured to generate excitation signal 116 using at least one of Lockin ultrasound thermography and burst thermography. Lockin ultrasound thermography includes transmitting excitation signal 116 to component 104 using waveforms modulated at a selected frequency. In the exemplary embodiment, the frequency of the excitation signal 116 is the Lockin frequency. Burst thermography includes transmitting excitation signal 116 to component 104 using waveforms which are applied in short burst waves. For example, short burst waves include a waveform with a first amplitude and a first frequency that is emitted for a period of time followed by a waveform with a second amplitude and a second frequency that is emitted for a second period of time. In the exemplary embodiment, the second amplitude is substantially less than the first amplitude. The bursts may be repeated in an oscillating pattern.

In addition, in the exemplary embodiment, optical device 152 is configured to generate excitation signal 116 using at least one of Lockin optical thermography and pulsed thermography. Lockin optical thermography includes transmitting excitation signal 116 to component 104 using a waveform modulated at a frequency, for example a sinusoidal wave. In the exemplary embodiment, the frequency of excitation signal 116 is the Lockin frequency. Pulsed thermography includes transmitting excitation signal 116 to component 104 using pulsed wave forms, for example square wave forms. In alternative embodiments, excitation signal 116 is transmitted to component 104 in any manner that enables thermographic inspection system 108 to operate as described herein. For example, in some embodiments, excitation signal 116 is frequency modulated.

In addition, in the exemplary embodiment, positionable apparatus 106 is configured to move thermographic camera 114 relative to component 104 such that thermographic camera 114 is configured to capture thermal images 124 of areas of component 104. Specifically, thermographic camera 114 is configured to capture thermal images 124 of areas of component 104 exposed to excitation signal 116. When exposed to excitation signal 116, anomalies 102 within component 104 generate detectable reactionary thermal signal 118. Accordingly, thermographic camera 114 is configured to capture thermal images 124 of reactionary thermal signal 118 of component 104. In the exemplary embodiment, thermographic camera 114 includes any device that generates heat zone images using infrared radiation such as, for example and without limitation, an infrared camera, a thermal imaging camera, and/or an infrared thermography device.

Moreover, in the exemplary embodiment, positionable apparatus 106 is configured to move relative to component 104 and position at least one of excitation device 112 and thermographic camera 114 relative to component 104. For example, in some embodiments, positionable apparatus 106 is configured to move around a perimeter of component 104 to allow thermographic inspection system 108 to inspect difficult to access parts of component 104. In alternative embodiments, positionable apparatus 106 includes any equipment that allows or causes motion of positionable apparatus 106 about component 104. Equipment includes, for example and without limitation, a motorized apparatus, a handheld borescope, and/or a flexible cable.

Also, in the exemplary embodiment, thermographic camera 114 is configured to capture thermal images 124. In some embodiments, thermal images 124 are collected and analyzed in real time and/or recorded for later analysis. Thermal images 124 are either monochrome or multicolored images and represent thermal patterns of component 104. For example, each thermal image 124 includes a pixel array. Each pixel of the pixel array is a data acquisition point for a thermal measurement and is colored coded based on a preset thermal scale (e.g., darker pixels represent a higher/lower temperature and lighter pixels represent a lower/higher temperature).

In addition, in the exemplary embodiment, controller 110 analyzes each pixel of thermal images 124 by applying a Fourier transform at the frequency of modulation, i.e., the Lockin frequency. After applying the Fourier transform, controller 110 is configured to generate at least one of a phase image and an amplitude image. Reactionary thermal signals 118 are identifiable as variations in the amplitude images or the phase images. In alternative embodiments, controller 110 analyzes thermal images 124 in any manner that enables system 100 to operate as described herein. For example, in some embodiments, controller 110 analyzes thermal images 124 by comparing the color of individual pixels relative to the color of the pixel in a previous thermal images 124 and/or the color of adjacent pixels. Controller 110 identifies reactionary thermal signal 118 by identifying at least one pixel that has a color different from the color of surrounding pixels and/or the color of the pixel in previous thermal images 124. In alternative embodiments, controller 110 analyzes thermal images 124 by applying discrete wavelet transformations or any method of compression of thermal images 124.

Also, in the exemplary embodiment, controller 110 includes at least one transceiver 126, at least one processor 128, and a memory 130. In some embodiments, at least a portion of controller 110 is incorporated into positionable apparatus 106. Controller 110 is communicatively coupled to excitation device 112 and thermographic camera 114. Processor 128 is configured to process thermal images 124 received from thermographic camera 114. In the exemplary embodiment, transceivers 126 allow communication between a portion of controller 110 on thermographic inspection system 108 and an external portion of controller 110. In alternative embodiments, at least one of transceivers 126 is omitted and controller 110 is completely integrated into inspection system 108 or is completely external to inspection system 108.

Moreover, in the exemplary embodiment, controller 110 is configured to cause excitation device 112 to emit excitation signals 116 and controller 110 is configured to regulate a frequency and magnitude of excitation signals 116. Further, controller 110 is configured to receive thermal images 124 from thermographic camera 114 and analyze thermal images 124 to detect the presence of anomalies 102 within component 104. In alternative embodiments, thermographic inspection system 108 and controller 110 communicate in any manner that enables positionable apparatus 106 to operate as described herein.

In addition, in the exemplary embodiment, system 100 includes a user interface 132 that is configured to display information relating to the characteristics detected by thermographic inspection system 108 for interpretation by the user. For example, in some embodiments, user interface 132 displays thermal images 124 of components 104. User interface 132 may be included on a remote computing device 134 and/or incorporated with controller 110. In some embodiments, user interface 132 includes, among other possibilities, a web browser and/or a client application. In some embodiments, user interface 132 allows a user to input and/or view information relating to control of positionable apparatus 106. In the exemplary embodiment, user interface 132 is configured to display information relating to the state of one or more of thermographic inspection system 108, a drive system 136, a power source 138, and a steering component 140 for interpretation by a human operator. Processor 128 translates user inputs into steering, inspection motion, manipulator arm motion, camera control, sensor control, sensor motion, and/or any other commands and sends information via transceiver 126 to positionable apparatus 106. In some embodiments, user control of positionable apparatus 106 is in real time, such as through a joystick, keyboard, touchscreen or other interface having similar function. In other embodiments, positionable apparatus 106 is controlled partially or wholly according to a pre-programmed routine. In some embodiments, a user inputs information, such as operation goals or conditional directions, and positionable apparatus 106 is at least partially automated. In further embodiments, controller 110 logs information, such as information received by controller 110 from positionable apparatus 106, control data sent to positionable apparatus 106, and additional user inputs or state information (e.g., location, time, orientation, datalink quality, battery levels, repair material levels, failure mode indicators) into memory 130.

Figure 2:
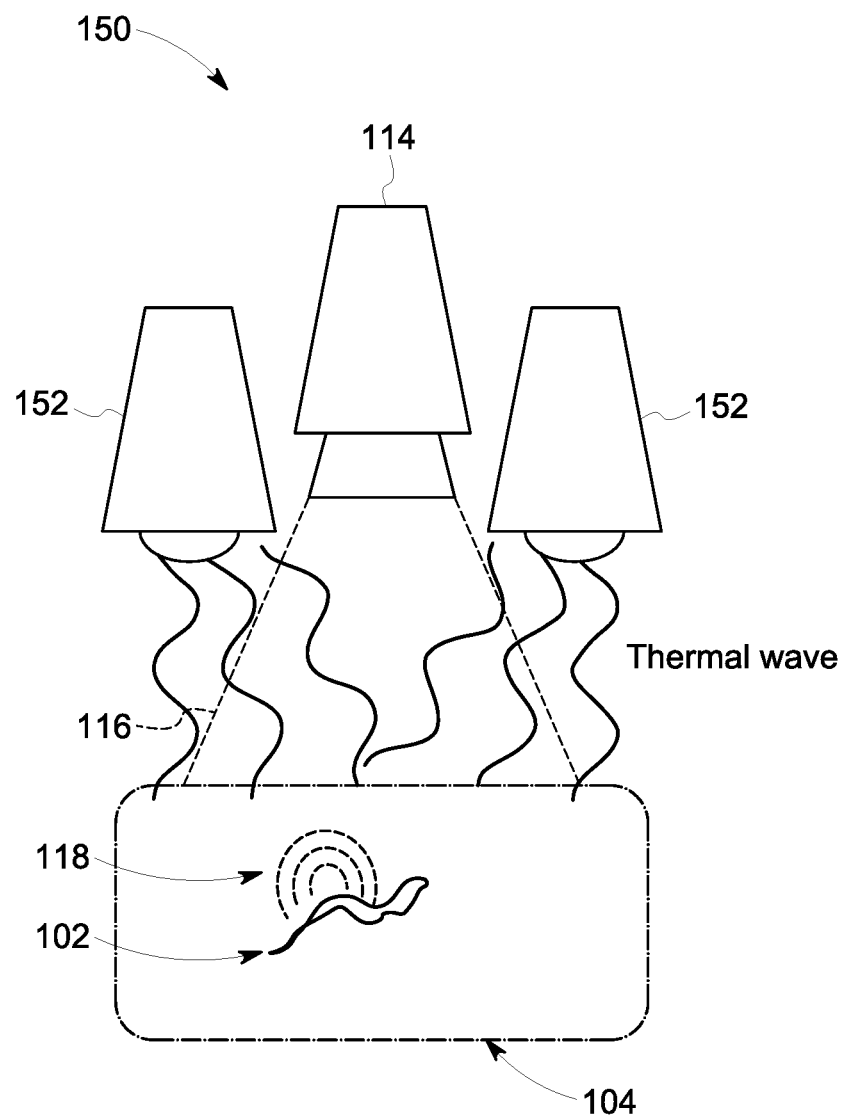
FIG. 2 is a schematic diagram of a portion of an exemplary thermographic inspection system for use with the system shown in FIG. 1, the thermographic inspection system including an optical signal device.

FIG. 2 is a schematic diagram of a portion of an exemplary thermographic inspection system 150 for use with system 100 (shown in FIG. 1). Thermographic inspection system 150 includes at least one optical device 152 and thermographic camera 114. In the exemplary embodiment, optical devices 152 include any device that deposits heat to component 104. Optical devices 152 apply heat to component 104 via, for example and without limitation, radiation, conduction, or convection. In some embodiments, optical devices 152 include, for example and without limitation, flash lamps, halogen lamps, and/or lasers. Accordingly, in the exemplary embodiment, optical devices 152 emit excitation signals 116 in the form of thermal waves. Excitation signal 116 is amplitude modulated at a selected frequency by the controller 110. The selected frequency is then stored and used as the "Lockin frequency", i.e., the frequency of amplitude modification of a signal for a Fourier transform, for controller 110 to analyze thermal images 124 (shown in FIG. 1). When exposed to excitation signal 116, anomalies 102 within component 104 act as thermal boundaries, reflecting back a thermal wave as reactionary thermal signal 118. Thermal images 124 of reactionary thermal signal 118 are captured by thermographic camera 114. In alternative embodiments, thermographic inspection system 150 includes any optical device 152 that enables thermographic inspection system 150 to operate as described herein. For example, in some embodiments, optical device 152 is not necessarily synchronized with thermographic camera 114 and excitation signal 116 is pulsed or continuously emitted.

Figure 3:
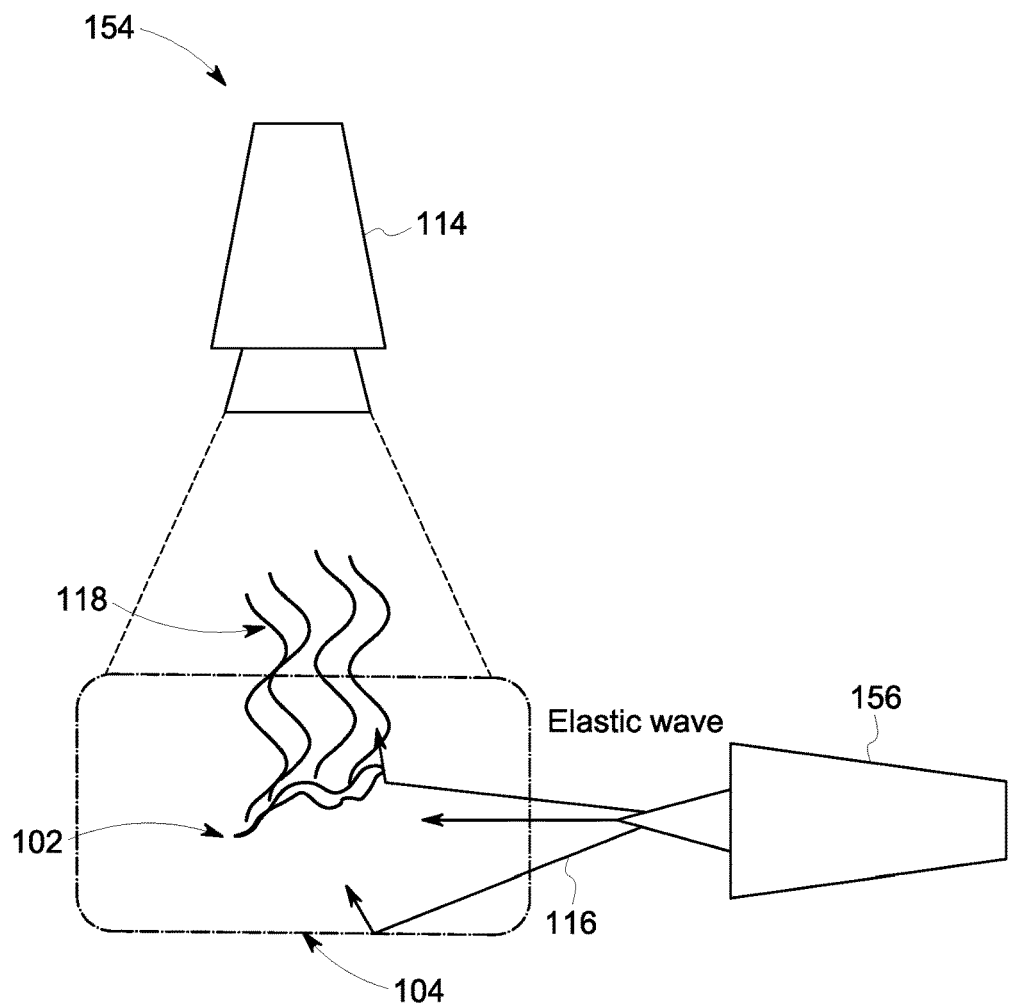
FIG. 3 is a schematic diagram of a portion of an exemplary thermographic inspection system for use with the system shown in FIG. 1, the thermographic inspection system including an ultrasound device.

FIG. 3 is a schematic diagram of a portion of an exemplary thermographic inspection system 154 for use with system 100 (shown in FIG. 1). Thermographic inspection system 154 includes ultrasound device 156 and thermographic camera 114. In the exemplary embodiment, ultrasound device 156 includes any ultrasound imaging and/or sonography device that generates sound waves at a frequency greater than 20 kilohertz. Ultrasound device 156 emits excitation signal 116 in the form of an elastic energy wave. When exposed to excitation signal 116, anomalies 102 within component 104 convert the elastic energy wave into heat which is reflected back to the thermographic camera 114 as a reactionary thermal signal 118. In the exemplary embodiment, excitation signal 116 is amplitude modulated at the Lockin frequency by controller 110 causing anomalies 102 to pulsate at modulation frequency which generate reactionary thermal signal 118. Generally, only anomalies 102 can convert elastic waves into heat and therefore thermographic inspection system 150 is a defect selective "dark field" technique in which only anomalies 102 will generate reactionary thermal signal 118. Moreover, thermographic camera 114 is configured to capture reactionary thermal signal 118 generated by anomaly 102 in thermal images 124.

Figure 4:
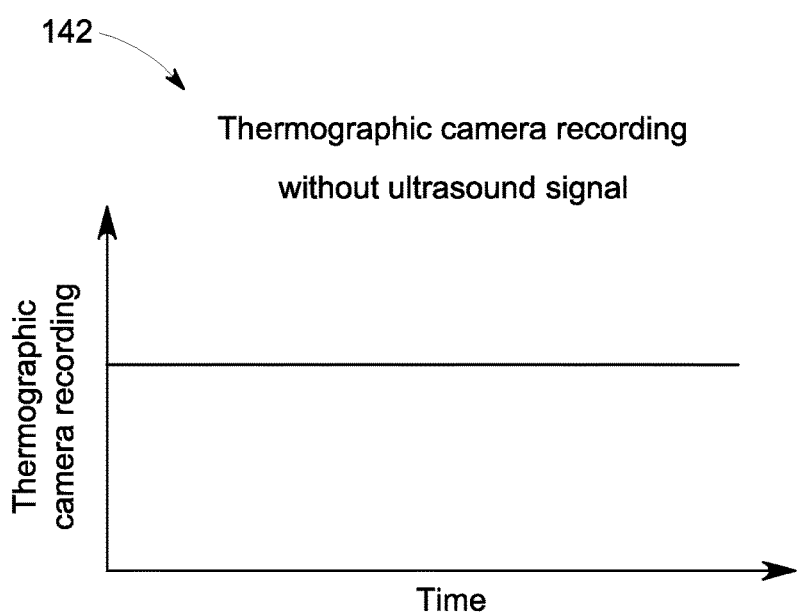
FIG. 4 is a graphical representation of a baseline thermographic recording of a Fourier transform of a thermal images of a component generated using a thermographic camera.

FIG. 4 is a graphical representation of a Fourier transform of a baseline thermographic recording of a thermal image 142 of component 104 generated using thermographic camera 114. In the exemplary embodiment, the baseline thermal image 142 is captured by thermographic camera 114 in the absence of excitation signal 116 emitted from ultrasound device 156. Thermal image 142 depicts a nominal and consistent thermal image 142, i.e., anomalies are not detectable in the consistent thermal image.

Figure 5:
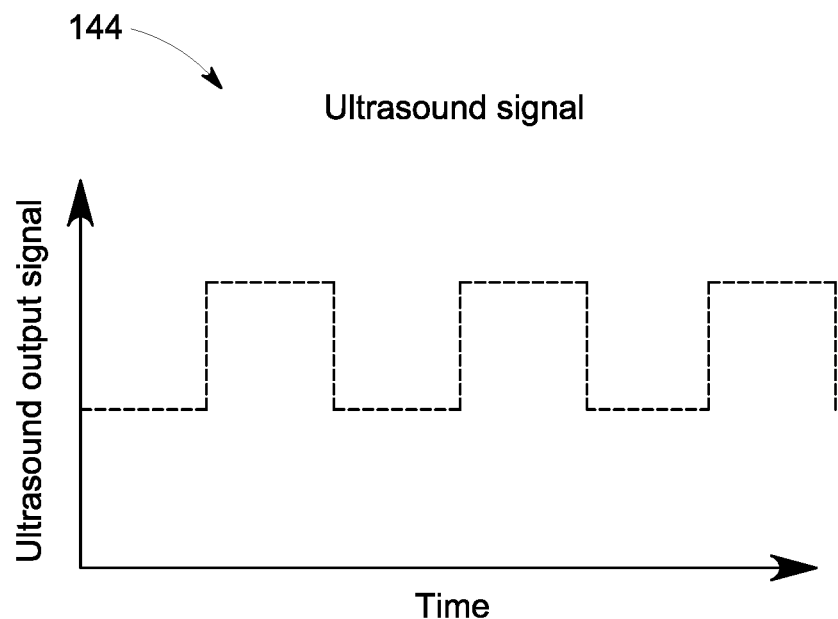
FIG. 5 is a graphical representation of an ultrasound signal.

FIG. 5 is a graphical representation of an excitation signal 144 as a function of time. Excitation signal 144 is emitted from ultrasound device 156 (shown in FIG. 3). In the exemplary embodiment, excitation signal 144 is a periodic square waveform. In some embodiments, excitation signal waveform includes, for example and without limitation, sinusoidal, triangle, and/or saw-tooth curves. In alternative embodiments, emitted excitation signal 144 can be any waveform that enables thermographic inspection system 154 (shown in FIG. 3) to operate described herein.

Figure 6:
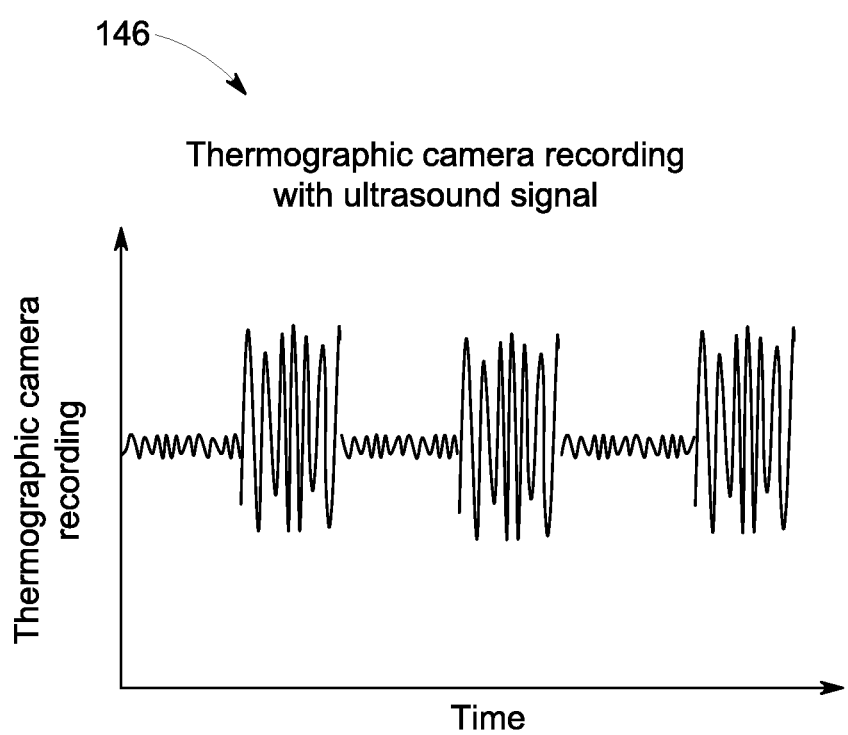
FIG. 6 is a graphical representation of a Fourier transform of a thermographic camera recording of a thermal image of a component versus time in the presence of the excitation signal emitted from the ultrasound device shown in FIG. 3.

FIG. 6 is a graphical representation of thermographic camera 114 recording of a Fourier transform of a thermal image 146 of component 104 in the presence of excitation signal 144 emitted from ultrasound device 156. Thermal image 146 of component 104 is captured by thermographic camera 114. Excitation signal 144 emitted from ultrasound device 156 is a periodic square waveform (shown in FIG. 5). Reactionary thermal signal 118 is identified in the recording of the Fourier transform of thermal images 146 by identifying increases in frequency and amplitude. For example, recordings of Fourier transform of thermal image 146 includes areas that have increased frequency and amplitude in comparison to the baseline recording of Fourier transform of thermal images 142. The areas of increased frequency and amplitude correspond to reactionary thermal signal 118. Accordingly, controller 110 (shown in FIG. 1) identifies reactionary thermal signal 118 in Fourier transform of thermal image 146 by identifying areas of increased frequency and/or amplitude in Fourier transform of thermal image 146. In the exemplary embodiment, controller 110 (shown in FIG. 1) relates reactionary thermal signal 118 to a specific location on thermal image 124. Controller relates the location on thermal image 124 with a location on component 104 (shown in FIG. 1) to identify the position of anomalies 102 within component 104.

Figure 7:
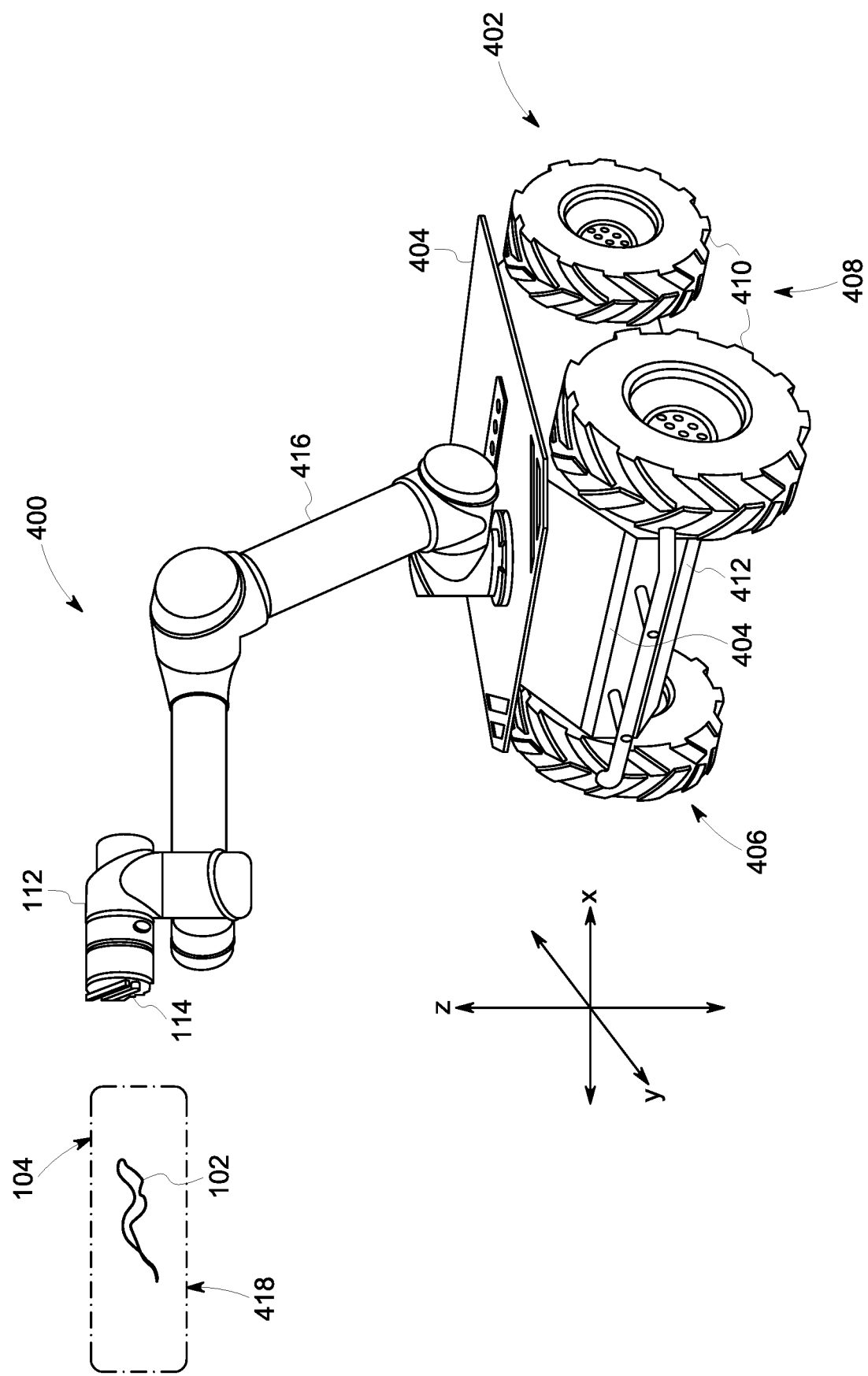
FIG. 7 is a perspective view of an exemplary embodiment of a positionable apparatus for use with the system shown in FIG. 1.

FIG. 7 is a schematic view of an exemplary embodiment of a positionable apparatus 400. In the exemplary embodiment, positionable apparatus 400 is configured to travel about component 104. Accordingly, positionable apparatus 400 facilitates inspection of component 104 at locations that are difficult to access. Moreover, positionable apparatus 400 can be deployed in the field to further facilitate inspection of components 104 that would be difficult and costly to transport to inspection sites. During operation, positionable apparatus 400 moves about component 104. In alternative embodiments, positionable apparatus 400 moves along any path that enables positionable apparatus 400 to operate as described herein.

Also, in the exemplary embodiment, positionable apparatus 400 includes a motorized apparatus 402 including a body 404 and a drive system 406. Drive system 406 is coupled to body 404 and is configured to move body 404 relative to component 104. Drive system 406 includes a drive mechanism 408, such as wheels 410, and one or more motors 412 coupled to the drive mechanism 408. A power source, such as a battery (not shown in FIG. 7), provides power for operation of motor 412. During operation of motorized apparatus 402, motor 412 induces rotation of wheels 410 relative to body 404. Motorized apparatus 402 moves along any surface as wheels 410 rotate in contact with the surface. In the exemplary embodiment, drive system 406 is a differential drive system and is capable of rotating each wheel 410 at a speed different from the rotational speed of the other wheels 410. In alternative embodiments, motorized apparatus 402 includes any drive system 406 that enables motorized apparatus 402 to operate as described. For example, in some embodiments, drive system 406 includes a drive mechanism 408 other than wheels, such as treads, tracks, worms, legs, and/or electromagnetic for fluidic locomotion mechanisms. In further embodiments, motorized apparatus 402 includes any mechanism that enables motorized apparatus 402 to operate as described herein. For example, in some embodiments, motorized apparatus 402 includes, for example and without limitation, fans, thrusters, electrostatic adhesion devices, suction devices, and/or vacuum adhesion devices.

Also, in the exemplary embodiment, positionable apparatus 400 includes a manipulator arm 416 coupled to motorized apparatus 402. Manipulator arm 416 is articulated and has a plurality of degrees of movement relative to motorized apparatus 402. In the exemplary embodiment, excitation device 112 and thermographic camera 114 of thermographic inspection system 108 are mounted to manipulator arm 416. Manipulator arm 416 is configured to adjustably position thermographic inspection system 108 relative to component 104 for investigation of targets of interest 418 which may include at least one anomaly 102. In the exemplary embodiment, manipulator arm 416 includes at least two or more linkages connected with joints. Joints are actuated using any mechanism that enables manipulator arm 416 to operate as described herein. For example, in some embodiments, manipulator arm 416 is actuated using, for example and without limitation, servo motors, linear actuators, solenoid actuators, pneumatic actuators, and/or hydraulic actuators. In addition, in the exemplary embodiment, a power source, such as a battery, provides power for operation of manipulator arm 416. In alternative embodiments, manipulator arm includes any apparatus that enables manipulator arm to operate as described herein.

Figure 8:
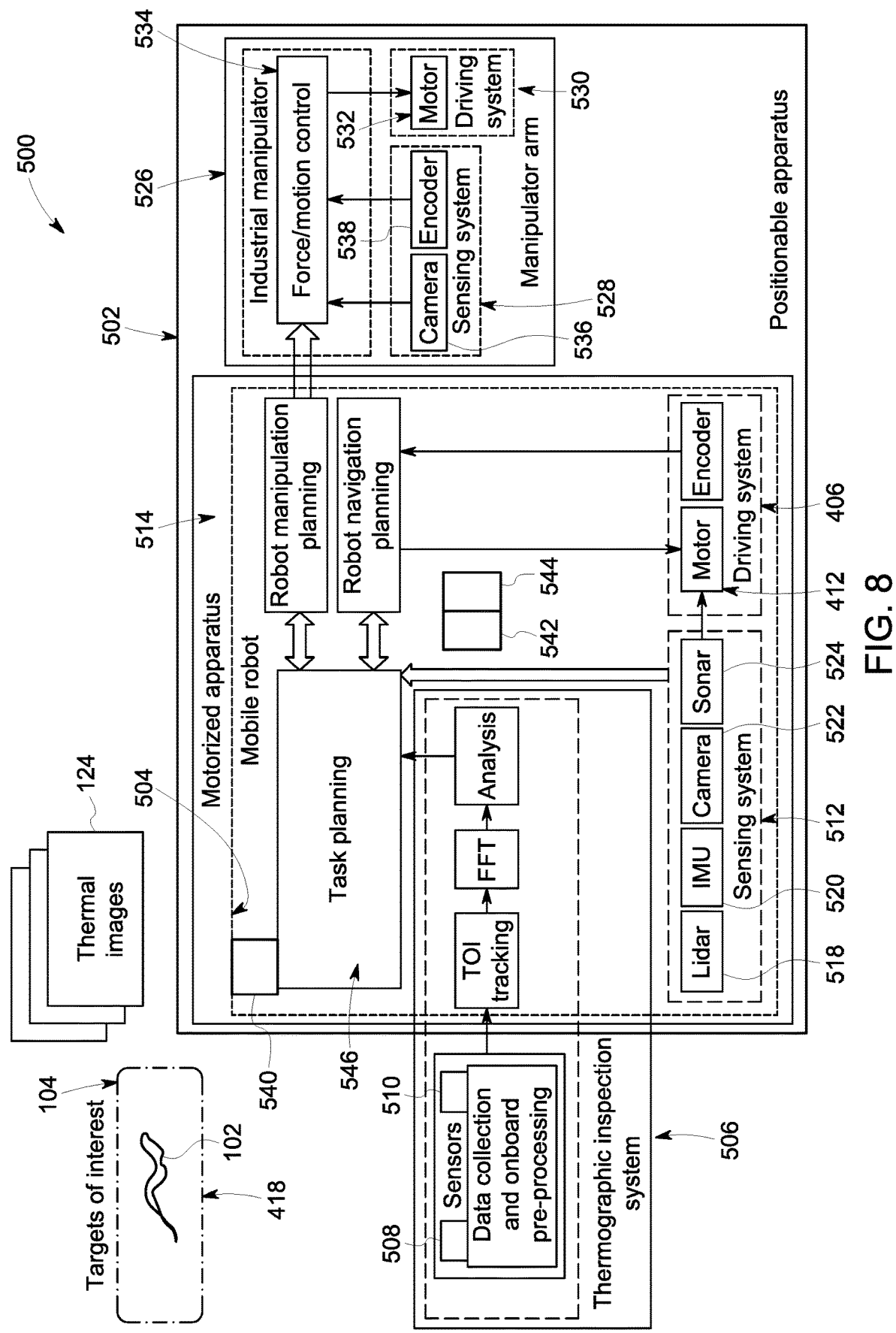
FIG. 8 is a schematic diagram of an exemplary system for detecting anomalies within a component, the system including a positionable apparatus and a thermographic inspection system.

FIG. 8 is a schematic diagram of an exemplary system 500 for detecting at least one anomaly 102 within component 104. System 500 includes a positionable apparatus 502, a controller 504, and a thermographic inspection system 506. Thermographic inspection system 506 includes at least one excitation device 508 and at least one thermographic camera 510. In the exemplary embodiment, at least a portion of controller 504 is incorporated into positionable apparatus 502. In alternative embodiments, system 500 includes any components that enable system 500 to operate as described herein.

Also, in the exemplary embodiment, targets of interest 418 are identified by analyzing thermal images 124 and storing locations of component 104 where reactionary thermal signal 118 (shown in FIG. 1) is identified. Controller 504 is configured to automatically track and record the locations of targets of interest 418 for further inspection. In alternative embodiments, targets of interests 418 are identified for thermographic inspection system 506 to investigate by any means that enable system 500 to operate as described herein.

In addition, in the exemplary embodiment, a localization system 512 is coupled to a motorized apparatus 514 of positionable apparatus 502. In the exemplary embodiment, localization system 512 is configured to transmit information for steering motorized apparatus 514 and/or performing inspection operations. In the exemplary embodiment, localization system 512 includes a light detection and ranging (Lidar) device 518, an inertial measurement unit (IMU) 520, a camera 522, and a sonar device 524. In alternative embodiments, motorized apparatus 514 includes any localization sensors that enable motorized apparatus 514 to operate as described herein. For example, in some embodiments, motorized apparatus 514 includes an infrared camera and/or eddy current sensors.

Also, in the exemplary embodiment, positionable apparatus 502 includes a manipulator arm 526 including a localization system 528, a drive system 530, and a manipulator arm motor 532 that induces motion of manipulator arm 526 relative to body 404 of positionable apparatus 502. Manipulator arm motor 532 includes any motor which enables manipulator arm 526 to operate as described herein. For example, in some embodiments, manipulator arm motor 532 includes, for example and without limitation, a stepper motor, a linear actuator, a servo motor and/or a direct current (DC) motor. A controller 534 controls motor 532 and therefore motion of manipulator arm 526. In some embodiments, controller 534 is incorporated into controller 504 of motorized apparatus 514.

In addition, in the exemplary embodiment, localization system 528 includes at least one sensor such as a camera 536 and/or an encoder 538. For example, camera 536 captures images from the pose of manipulator arm 526 and enables controller 534 to determine the pose of manipulator arm 526 relative to the environment. Encoder 538 provides the position of manipulator arm motor 532 for controller 534. In alternative embodiments, positionable apparatus 502 includes any localization system 528 that enables positionable apparatus 502 to operate as described herein. For example, in some embodiments, localization system 528 includes, without limitation, a position sensor, a Lidar device, an IMU, a camera, a sonar device, an infrared camera, eddy current sensors, and/or any other suitable sensor. In the some embodiments, localization system 528 is configured to use at least one sensor of thermographic inspection system 506. In further embodiments, localization system 528 and localization system 512 are integrated into a single unit.

In the exemplary embodiment, controller 504 controls operation of positionable apparatus 502 and includes a transceiver 540, processor 542, and memory 544. Transceiver 540 is communicatively coupled with motorized apparatus 514 and is configured to send information to and receive information from motorized apparatus 514. In the exemplary embodiment, controller 504 communicates wirelessly with motorized apparatus 514. For example, controller 504 is configured to send information to motorized apparatus 514 relating to the propulsion and/or steering of motorized apparatus 514 while motorized apparatus 514 is moving around component 104. In alternative embodiments, motorized apparatus 514 and controller 504 communicate in any manner that enables motorized apparatus 514 to operate as described herein. For example, in some embodiments, controller 504 and motorized apparatus 514 exchange information through a wired link extending between motorized apparatus 514 and controller 504. In addition, processor 542 is configured to execute instructions for controlling thermographic inspection system 506, and/or drive system 530 of motorized apparatus 514. In alternative embodiments, motorized apparatus 514 includes any controller 504 that enables motorized apparatus 514 to operate as described herein. In some embodiments, transceiver 540, processor 542, and/or memory 544 is omitted.

Also, in the exemplary embodiment, controller 504 includes a task planning module 546. Task planning module 546 is configured to send tasks for execution by controllers 504, 534. Task planning module 546 includes a planning algorithm that is configured to receive input feedback from localization systems 512, 528 and receive analyzed thermal images 124. Based on the inputs, planning algorithm provides tasks for system 500. In some embodiments, tasks include, for example and without limitation, further inspection of targets of interest 418, alternating frequency and magnitude of excitation signal 116, and recording thermal images 124 using thermographic camera 510. Task planning module 546 is further configured to send tasks to positionable apparatus 502 such as directions for moving positionable apparatus 502 about component 104. Task planning module 546 is further configured to send tasks to manipulator arm 526 such as positioning manipulator arm 526 relative to positionable apparatus 502 or about component 104. Controller 504 and controller 534 are configured to execute tasks provided by task planning module 546 by transmitting signals to motorized apparatus 514 and/or manipulator arm 526. Also, task planning module 546 is configured to log targets of interest 418 and analyze thermal images 124. In alternative embodiments, task planning module 546 has any configuration that enables positionable apparatus 502 to operate as described herein.

Moreover, in the exemplary embodiment, task planning module 546 is configured to determine the location of positionable apparatus 106 relative to the component 104, including positioning motorized apparatus 514, manipulator arm 526, and thermographic inspection system 506 relative to the component 104. Task planning module 546 is configured to generate a sequence of waypoints that lead from initial location of positionable apparatus 106 to a final location along a path. Waypoints are geographical X-position, Y-position, and Z-position locational markers determined relative to relative to component 104. Controller 504 and controller 534 are configured to control the position, velocity, and acceleration of motorized apparatus 514 and manipulator arm 526 as motorized apparatus 514 and manipulator arm 526 move between waypoints along the path.

In some embodiments, task planning module 546 is configured to determine a first path for at least one of motorized apparatus 514 and manipulator arm 526 to move between individual waypoints. Controller 504 and controller 534 are configured to execute the first path provided by task planning module 546 by transmitting signals to one of driving system 532 and driving system 406. Task planning module 546 receives signals from sensing systems 528 and 406 to determine a second path based on the received signals. For example, sensing systems 528 and 406 may detect an obstruction and task planning module 546 determines the second path, wherein the second path includes waypoints that are relative to the detected obstruction(s). In some embodiments, controller 504 uses motion planning algorithms to determine a path for motorized apparatus 514 and manipulator arm 526 between waypoints. For example, motion planning algorithms include a potential field algorithm and a rapidly-exploring random tree (RRT)-connect algorithm. In further embodiments, controller 110 utilizes, for example and without limitation, RTT and/or path finding algorithms. In alternative embodiments, system 500 uses any algorithms that allow system 500 to operate as described herein.

Moreover, task planning module 546 can generate a third path for at least one of motorized apparatus 514 and manipulator arm 526. Task planning module 546 generates a third path based on analyzed thermal images 124. For example, if anomaly 102 is detected, task planning module 546 can generate new waypoints for at least one of motorized apparatus and manipulator arm to move thermographic inspection system 506 in relation to anomaly 102 for further inspection of anomaly 102.

Figure 9:
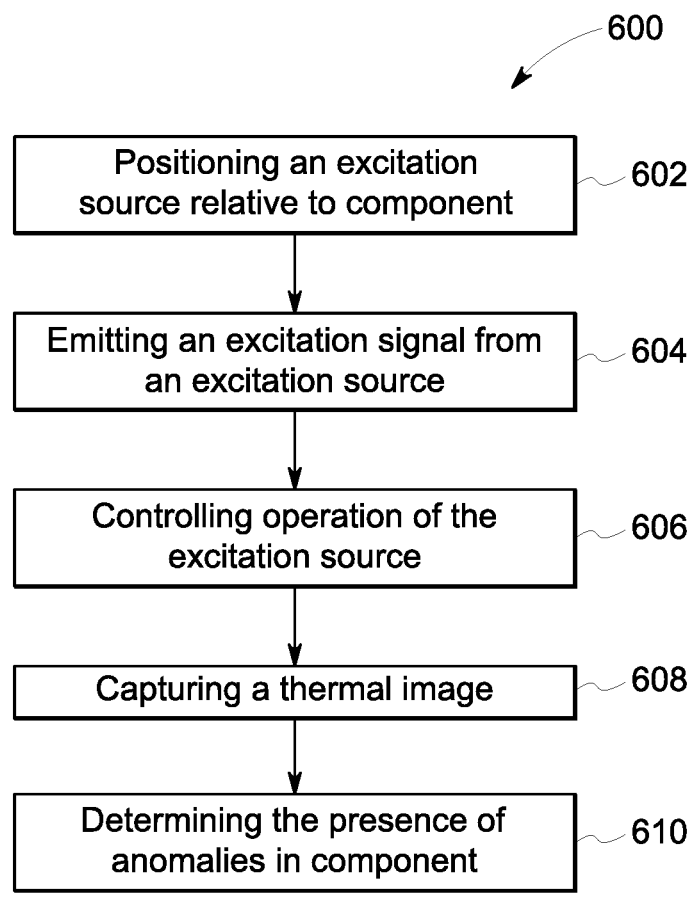
FIG. 9 is a flow diagram of an exemplary method for detecting anomalies within a component using a thermographic imaging system.

FIG. 9 is a flow diagram of a method 600 of detecting at least one anomaly 102 within component 104. In reference to FIGS. 1, 7, and 9, in the exemplary embodiment, method 600 includes positioning 602 excitation device 112 relative to component 104, emitting 604 excitation signals 116 from excitation device 112, controlling 606 operation of excitation device 112, capturing 608 thermal images 124 of component 104, and determining 610 the presence of anomalies 102 within component 104.

In the exemplary embodiment, positioning 602 excitation device 112 relative to component 104 includes positioning 602 motorized apparatus 402 about component 104 and rotating wheels 410 to drive motorized apparatus 402 about component 104. Positioning 602 further includes positioning manipulator arm 416 relative to component 104. For example, manipulator arm 416 is moved in at least one of a X-direction, a Y-direction, and a Z-direction in reference to the orientation shown in FIG. 7. Accordingly, manipulator arm 416 is moved around, under, and above component 104. Moreover, motorized apparatus 402 is moved in the X-Y plane to move manipulator arm 416 and excitation device 112 about component 104. In alternative embodiments, excitation device 112 is positioned relative to component 104 in any manner that enables system 100 to operate as described herein.

In addition, in the exemplary embodiment, excitation signals 116 are emitted 604 from excitation device 112 toward and through component 104. Accordingly, anomalies 102 within component 104 generate reactionary thermal signal 118 in response to excitation signal 116. Controlling 606 operation of excitation device 112 involves controlling at least one characteristic of excitation signal 116 such as a frequency, a wavelength, an amplitude, and/or direction.

In some embodiments, thermographic camera 114 is moved relative to component 104 prior to or while capturing 608 thermal image 124. For example, thermographic camera 114 is coupled to manipulator arm 416 and moves with manipulator arm 416 and excitation device 112 when excitation device 112 is positioned 602 relative to component 104. Thermographic camera 114 is oriented substantially the same as excitation device 112 and is configured to capture images of the area of component 104 exposed to excitation signal 116. In some embodiments, thermographic camera 114 records a continuous image or a series of still images of at least a portion of component 104 while excitation device 112 emits excitation signal 116. In further embodiments, thermographic camera 114 captures at least one image after excitation signal 116 has stopped and/or between pulses of excitation signal 116. Accordingly, thermographic camera 114 is configured to capture thermal images when anomalies 102 within component 104 generate reactionary thermal signal 118. In alternative embodiments, thermographic camera 114 captures any images that enable thermographic inspection system 108 to operate as described herein.

Also, in the exemplary embodiment, controller 110 determines 610 the presence of anomalies 102 based on reactionary thermal signals 118 captured in thermal images 124. For example, in some embodiments, controller 110 compares thermal images 124 to a baseline thermal recording and identifies variations in frequency and/or amplitude. Controller 110 correlates the variations to locations on component 104 and determines that anomalies 102 are likely present in the component at the identified locations. In alternative embodiments, system 500 determines the presence of anomalies 102 in component 104 in any manner that enables system 500 to operate as described herein.

In some embodiments, data such as a model of component 104, images from thermographic camera 114, and/or the location of anomalies 102 is collected and/or stored by controller 110. For example, in some embodiments, collected data is sent and stored in a cloud based storage system. Moreover, a life-time model may be used to continuously compute and update analytics and maintenance planning. The accumulated data is utilized for the development of a machine learning model to improve inspection process accuracy and optimize the inspection process. In alternative embodiments, the data from system 100 is used in any manner that enables system 100 to operate as described herein.

Figure 10:
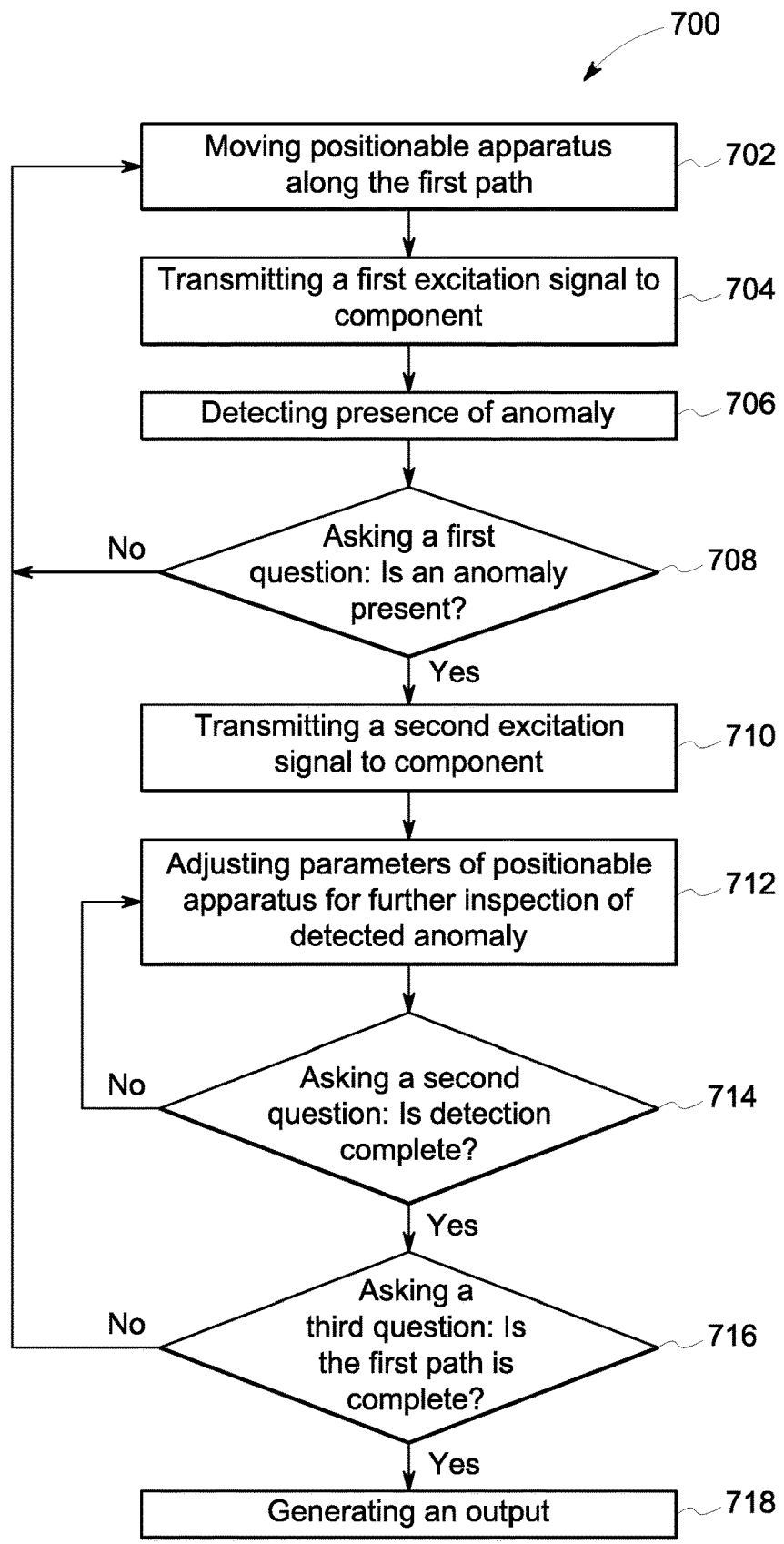
FIG. 10 is a flow diagram of an exemplary method for detecting anomalies within a component using a thermograph imaging system including real-time adjustment of operation of the system.

FIG. 10 is a flow diagram of a method 700 for anomaly 102 detection within component 104 including real-time adjustment of operation of system 100. In the exemplary embodiment, method 700 includes moving 702 positionable apparatus 106 along the first path, transmitting 704 a first excitation signal 116 to component 104, detecting 706 the presence of at least one anomaly 102, asking 708 a first question, transmitting 710 a second excitation signal 116, adjusting 712 a parameter of positionable apparatus 106 for further inspection of an anomaly, asking 714 a second question, asking a third question 716, and generating 718 an output.

In the exemplary embodiment, moving 702 positionable apparatus 106 includes moving positionable apparatus 106 between a series of waypoints along the first path generated by a task planning module. Moving 702 positionable apparatus 106 relative to component 104 includes positioning at least one of manipulator arm 416, motorized apparatus 402, and thermographic inspection system 108 relative to the component along a series of waypoints. Positioning manipulator arm 416 relative to the component includes controller 534 transmitting a signal to drive system 530 to cause manipulator arm 416 to move in at least one of an X-direction, a Y-direction, and a Z-direction in reference to the orientation shown in FIG. 7 to reach a waypoint along the first path. Accordingly, manipulator arm 416 is moved around, under, and above component 104. Positioning motorized apparatus 402 about component 104 includes controller 504 transmitting a signal to drive system 406 to cause motorized apparatus 402 to move about component 104 in the X-Y plane to reach a waypoint along the first path. moving at least one of motorized apparatus 402 and manipulator arm 416 about the component causes thermographic inspection system 108 to move relative to component 104 because thermographic inspection system 108 is mounted to manipulator arm 416 on motorized apparatus 402. Accordingly, motorized apparatus 402 and/or manipulator arm 416 are moved to cause thermographic inspection system 108 to reach a waypoint of the first path. In alternative embodiments, thermographic inspection system 108 is positioned relative to component 104 in any manner that enables system 100 to operate as described herein.

Also, in the exemplary embodiment, transmitting 704 a first excitation signal 116 to component 104 includes excitation device 112 transmitting excitation signals 116 to component 104 using at least one of burst thermography or pulsed thermography. Detecting 706 the presence of at least one anomaly 102 includes controller 110 detecting 706 the presence of anomalies 102 based on reactionary thermal signal 118 captured in the analyzed thermal images 124. In some embodiments, thermal images 124 include least one of phase images or amplitude images. For example, in some embodiments, controller 110 compares the analyzed thermal images 124 to a baseline thermal recording and identifies variations in frequency and/or amplitude to determine the presence of anomalies 102. Controller 110 correlates the variations to locations on component 104 and determines if anomalies 102 are likely present in the component at the identified locations. In alternative embodiments, the presence of anomalies 102 is determined in component 104 in any manner that enables system 100 to operate as described herein.

In addition, in the exemplary embodiment, asking 708 a first question, includes determining if there is a potential anomaly 102 present within component 104 based on results from detecting 706. If the answer to the first question is negative, method 700 returns to moving 702 positionable apparatus 106 along the first path. If the answer to the first question is positive, method 700 proceeds to transmitting 710 the second excitation signal 116. Transmitting 710 the second excitation signal 116 includes excitation device 112 transmitting excitation signal 116 to the component 104 using at least one of Lockin optical thermography and Lockin ultrasound thermography.

Moreover, in the exemplary embodiment, adjusting 712 parameters of the positionable apparatus 106 includes at least one of adjusting the position of positionable apparatus 106 relative to component 104 and adjusting parameters of the thermographic inspection system 108. The position of positionable apparatus 106 is adjusted by moving positionable apparatus 106 between a series of waypoints along a second path or a third path generated by a task planning module. The position of positionable apparatus 106 relative to component 104 is adjusted by positioning at least one of manipulator arm 416, motorized apparatus 402, and thermographic inspection system 108 relative to the component along a series of waypoints of at least one of the second path and third path. Positioning manipulator arm 416 relative to the component includes controller 534 transmitting a signal to drive system 530 to cause manipulator arm 416 to move in at least one of an X-direction, a Y-direction, and a Z-direction, in reference to the orientation shown in FIG. 7, to reach a waypoint of along at least one of the second path and the third path. Accordingly, manipulator arm 416 is moved around, under, and above component 104. Positioning motorized apparatus 402 about component 104 includes controller 504 transmitting a signal to drive system 406 to cause motorized apparatus 402 to move about component 104 in the X-Y plane to reach a waypoint along at least one of the second path and the third path. Moving thermographic inspection system 108 includes at least one of moving motorized apparatus 402 and manipulator arm 416 about the component to cause thermographic inspection system 108 to reach a waypoint along at least one of the second path and the third path. Adjusting parameters of the thermographic inspection system 108 include at least one of adjusting the amplitude and/or the frequency of the excitation signal 116 and adjusting the parameters of the thermographic camera. Parameters of the thermographic camera include, for example and without limitation, focal length, resolution, and zoom.

In addition, in the exemplary embodiment, asking 714 a second question includes determining if the detection of anomalies 102 is complete. If the answer to the second question is negative, method 700 repeats adjusting 712 parameters of the positionable apparatus 106. If the answer to the second question is positive, method 700 will proceed to asking 716 a third question. For example, method 700 will proceed to asking 716 if controller 110 is able to identify characteristics of anomalies 102 by analyzing thermal images 124. In this exemplary embodiment, characteristics of anomaly 102 include anomaly 102 shape and size, location of anomaly 102 relative to component. In alternative embodiments, characteristic of the anomaly 102 include anomaly 102 composition, anomaly type 102, i.e., delamination, crack or inclusion. A negative answer to asking 714 a second question includes controller 110 determining anomaly 102 characteristics are not identifiable. Accordingly, controller 110 returns to adjusting 712 parameters to dynamically adjust operation of thermographic imaging system 108 in real time. Controller 110 adjusts 712 one or more operating parameters to enable controller to determine additional information from thermal images 124. For example, in some embodiments, controller 110 adjusts characteristics of excitation signal 116 to induce a more pronounced or more readily identifiable reactionary signal in thermal image 124. Adjusting 712 and asking 714 are repeated until controller 110 determines that thermal images 124 meet a threshold criteria and controller 110 is able to completely analyze thermal images 124 to provide information on the areas of interest and determine characteristics of anomalies 102 if anomalies 102 are present.

Also, in the exemplary embodiment, asking 716 a third question includes asking if positionable apparatus 106 has completed the first path. If the answer to the third question is negative, method 700 will proceed to moving 702 positionable apparatus 106 along the first path. If the answer to the third question is positive, method 700 proceeds to generating 718 an output. In the exemplary embodiment, a positive answer to asking 716 a third question includes controller 110 determining if the position of positionable apparatus 106 is at a final waypoint of the first path. A negative answer to asking 716 a third question, includes controller 110 determining that the position of the positionable apparatus is farther from the position of the final waypoint of the first path than a threshold distance.

In addition, in the exemplary embodiment, generating 718 an output includes controller transmitting output signals to user interface for interpretation by a user. Outputs signals include for example and without limitation, analyzed thermal images 124, a map of component 104, a map of anomaly 102, and characteristic of the anomaly 102. Characteristics of the anomaly 102 include for example and without limitation, depth of anomaly 102 relative to component, shape and size of anomaly 102, type of anomaly 102, and/or composition of anomaly 102. In some embodiments, a spatial map is generated including locations of anomaly 102.

An exemplary technical effect of the methods, systems, and apparatus described herein includes at least one of: (a) reducing the time to inspect and/or repair machines; (b) increasing the accessibility of difficult-to-reach locations within a machine for inspection; (c) reducing the time that machines are out of service for maintenance; (d) allowing for complete inspection of an entire component without repositioning the component; (e) increasing accuracy of detection of anomalies within a component; (f) providing a non-destructive inspection means to detects anomalies not on the surface of components; and (g) increasing the precision and reliability of inspection of components.

Exemplary embodiments of methods, systems, and apparatus for maintaining rotary machines are not limited to the specific embodiments described herein, but rather, components of systems and/or steps of the methods may be utilized independently and separately from other components and/or steps described herein. For example, the methods, systems, and apparatus may also be used in combination with other systems requiring inspection and/or repair of components, and are not limited to practice with only the systems and methods as described herein. Rather, the exemplary embodiment can be implemented and utilized in connection with many other applications, equipment, and systems that may benefit from using a thermographic inspection system.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for detecting an anomaly within a component, said system comprising:
a motorized apparatus configured to move around a component;
an excitation device mounted to said motorized apparatus and configured to emit a first excitation signal and a second excitation signal toward the component, wherein the first excitation signal and the second excitation signal are effective to heat at least a portion of the component such that a presence of an anomaly within the portion of the component is identifiable;
wherein the excitation device is configured to emit the first excitation signal to cause the anomaly within the component to generate a first detectable reactionary thermal signal in response to the first excitation signal, and wherein said motorized apparatus is configured to position said excitation device relative to the component;
a camera mounted to said motorized apparatus and configured to capture thermal images of the component, wherein a first thermal image includes the first detectable reactionary thermal signal and indicates the presence of the anomaly within the component, and wherein said motorized apparatus is configured to position said camera relative to the component to capture the portion of the component exposed to the first excitation signal and the second excitation signal; and
a controller communicatively coupled to said excitation device and said camera, wherein said controller is configured to cause said excitation device to emit the first excitation signal, wherein said controller is configured to receive and analyze the first thermal image in response to the first excitation signal to detect the presence of the anomaly within the component,
wherein said controller is configured to create the second excitation signal by adjusting an operating parameter of the first excitation signal to affect a characteristic of the first detectable reactionary thermal signal based on the first thermal image, wherein the operating parameter includes at least one of a frequency of the first excitation signal, an amplitude of the first excitation signal, and a phase of the first excitation signal, and
wherein said controller is configured to cause said excitation device to emit the second excitation signal, wherein said controller is configured to receive and analyze a second thermal image in response to the second excitation signal, wherein the second thermal image includes a second detectable reactionary thermal signal and identify a characteristic of the anomaly within the component based on the second thermal image.

2. The system in accordance with claim 1, wherein said excitation device comprises at least one of an ultrasound device and an optical device.

3. The system in accordance with claim 1, wherein said motorized apparatus includes a drive system configured to move said motorized apparatus relative to the component.

4. The system in accordance with claim 3, wherein said drive system comprises a motor and a plurality of wheels operable to move said motorized apparatus relative to the component.

5. The system in accordance with claim 1, wherein said motorized apparatus is coupled with a manipulator arm, and wherein said manipulator arm is articulated and is configured to move relative to said motorized apparatus.

6. The system in accordance with claim 5, wherein said excitation device is coupled to said manipulator arm, and wherein said manipulator arm is capable of moving said excitation device relative to said motorized apparatus.

7. The system in accordance with claim 5, wherein said camera is coupled to said manipulator arm, and wherein said manipulator arm is capable of moving said camera relative to said motorized apparatus.

8. The system in accordance with claim 1, wherein said controller is configured to perform a Fourier transform at a selected frequency using the first thermal image.

9. The system in accordance with claim 1, wherein said controller includes a processor configured to analyze the first thermal image and the second thermal image and a memory configured to store the first thermal image and the second thermal image.

10. The system in accordance with claim 1, wherein said motorized apparatus includes at least one localization sensor, and wherein said controller is configured to receive localization sensor data from said at least one localization sensor and determine a position of said motorized apparatus relative to the component based on the localization sensor data.

11. The system in accordance with claim 1, wherein said controller is configured to control motion of said motorized apparatus relative to the component.

12. The system in accordance with claim 1, wherein said controller comprises a task planning module configured to determine at least one of a path for the motorized apparatus relative to the component and an inspection activity to be performed on the component.

13. A method for detecting an anomaly within a component, said method comprising:
moving a motorized apparatus relative to the component, wherein a controller determines a path for the motorized apparatus based on areas of interest within the component;
positioning an excitation device relative to the component, wherein the excitation device is coupled to the motorized apparatus;
emitting a first excitation signal from the excitation device toward the component, wherein the anomaly within the component generates a first detectable reactionary thermal signal in response to the first excitation signal;
controlling operation of the excitation device to control at least one characteristic of the first excitation signal;
positioning a thermographic camera relative to the component using the motorized apparatus;
capturing a first thermal image of at least a portion of the component using the thermographic camera when the anomaly within the component generates the first detectable reactionary thermal signal;
determining a presence of the anomaly in the component based on the first thermal image; and
creating a second excitation signal by adjusting an operating parameter of the first excitation signal to affect a characteristic of the first detectable reactionary thermal signal based on the first thermal image, wherein the operating parameter includes at least one of a frequency of the first excitation signal, an amplitude of the first excitation signal, and a phase of the first excitation signal;
emitting the second excitation signal from the excitation device toward the component, wherein the anomaly within the component generates a second detectable reactionary thermal signal in response to the second excitation signal;
capturing a second thermal image of at least the portion of the component using the thermographic camera when the anomaly within the component generates the second detectable reactionary thermal signal; and
identifying a characteristic of the anomaly within the component based on the second thermal image, wherein the first excitation signal and the second excitation signal are effective to heat at least the portion of the component such that the presence of the anomaly within the portion of the component is identifiable.

14. The method in accordance with claim 13, wherein emitting at least one of the first excitation signal and the second excitation signal comprises emitting at least one of an ultrasonic wave and a heat wave.

15. The method in accordance with claim 13, wherein controlling operation of the excitation device to control at least one characteristic of the first excitation signal comprises modulating an amplitude of the first excitation signal at a selected frequency.

16. An apparatus for detecting an anomaly within a component, said apparatus comprising:
a body;
a manipulator arm coupled to said body;
a drive system configured to move at least one of said body and said manipulator arm relative to the component, wherein said drive system is communicatively coupled to a controller configured to adjust an operating parameter of said drive system, wherein the operating parameter includes one of a position of said body relative to the component and a position of said manipulator arm relative to the component;
an excitation device mounted to said manipulator arm and configured to emit first excitation signal toward the component to cause the anomaly within the component to generate a first detectable reactionary thermal signal in response to the first excitation signal, wherein said excitation device is communicatively coupled to the controller, wherein the controller is configured to create a second excitation signal by adjusting an operating parameter of said first excitation signal to affect a characteristic of the first detectable reactionary thermal signal, and wherein the operating parameter includes at least one of a frequency of the first excitation signal, an amplitude of the first excitation signal, and a phase of the first excitation signal; and
a camera mounted to said manipulator arm and configured to capture thermal images of the component, wherein a first thermal image includes the first detectable reactionary thermal signal and indicate a presence of the anomaly within the component, wherein said manipulator arm is configured to position said camera relative to the component to capture a portion of the component exposed to the first excitation signal and the second excitation signal,
wherein said controller is configured to cause said excitation device to emit the second excitation signal, wherein said controller is configured to receive and analyze a second thermal image in response to the second excitation signal, wherein the second thermal image includes a second detectable reactionary thermal signal and wherein the controller is configured to identify a characteristic of the anomaly within the component based on the second thermal image, wherein the first excitation signal and the second excitation signal are effective to heat at least the portion of the component such that the presence of the anomaly within the portion of the component is identifiable.

17. The apparatus in accordance with claim 16, wherein said drive system comprises a motor and a plurality of wheels coupled to said body and configured to move said body relative to the component.

18. The apparatus in accordance with claim 16, wherein said drive system comprises at least one actuator configured to move said manipulator arm relative to said body.

19. The apparatus in accordance with claim 18, wherein said manipulator arm is configured to move said camera and said excitation device relative to the component, and wherein the controller is configured to adjust a position of said camera relative to a detected anomaly based on the thermal images to affect a characteristic of the first detectable reactionary thermal signal.

20. The apparatus in accordance with claim 16, wherein said excitation device comprises at least one of an ultrasound device and an optical device.

* * * * *